UNITED STATES PATENT OFFICE.

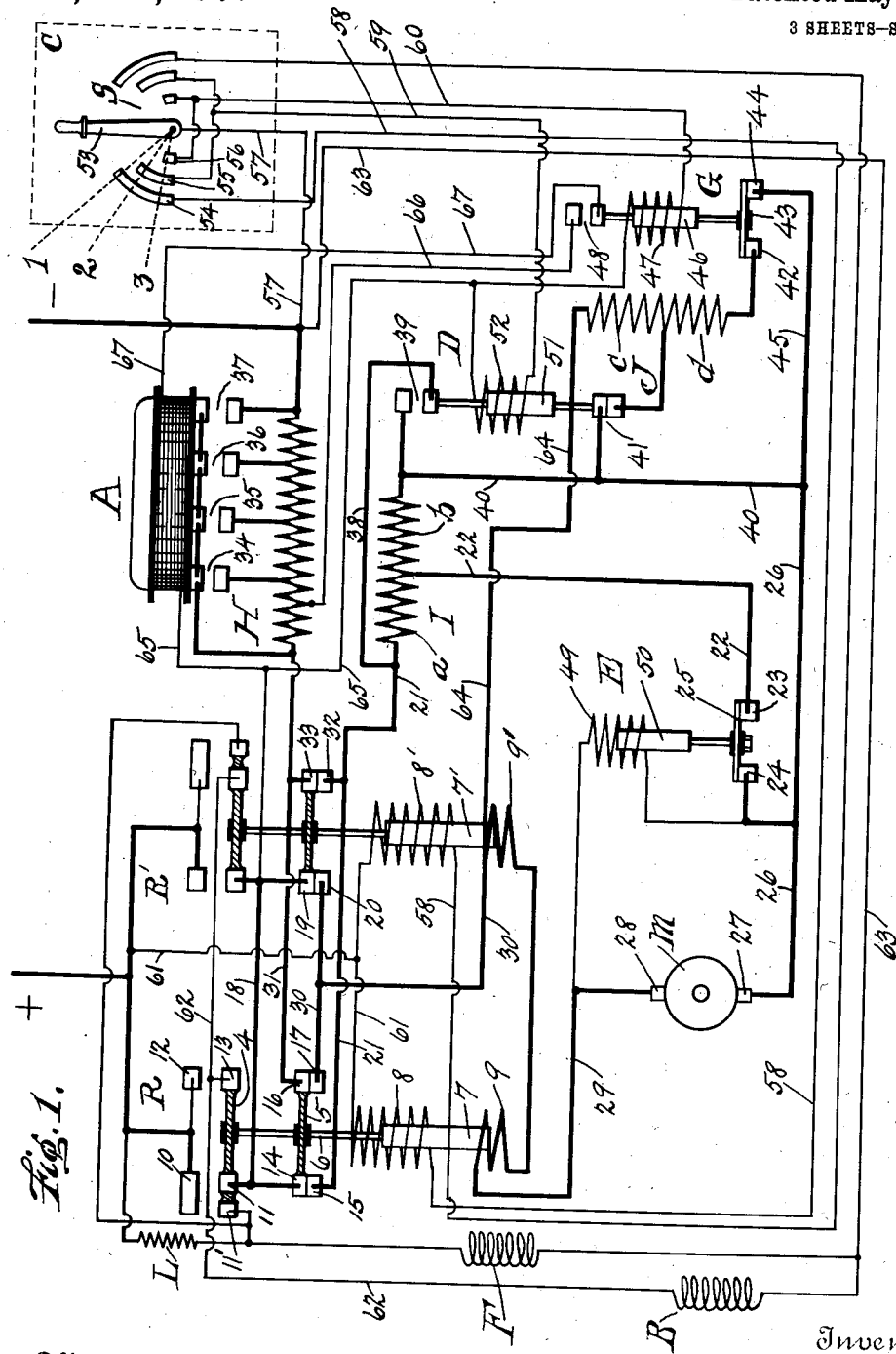

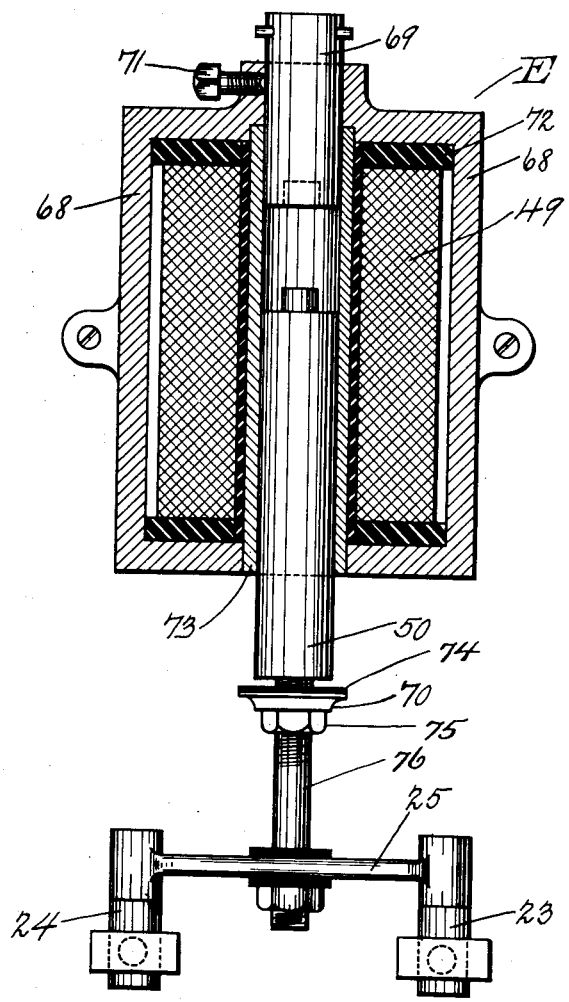

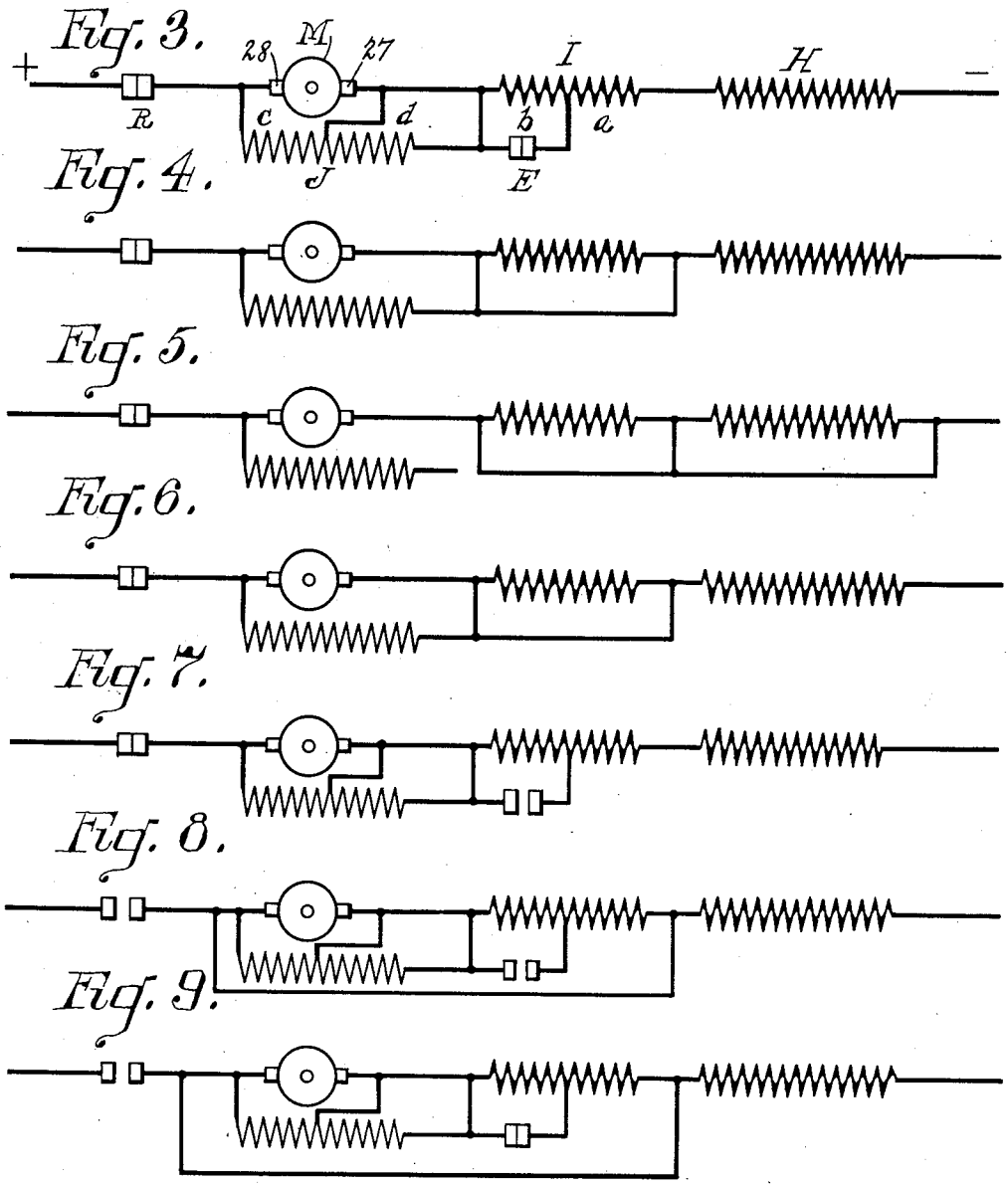

WILLIAM D. LUTZ, OF ALLENDALE, NEW JERSEY, ASSIGNOR TO OTIS ELEVATOR COMPANY, OF JERSEY CITY, NEW JERSEY, A CORPORATION OF NEW JERSEY.

MOTOR-CONTROLLING SYSTEM.

1,095,507. Specification of Letters Patent. Patented May 5, 1914.

Application filed December 6, 1909. Serial No. 531,496.

*To all whom it may concern:*

Be it known that I, WILLIAM D. LUTZ, a citizen of the United States, residing in the borough of Allendale, in the county of Bergen and State of New Jersey, have invented a new and useful Improvement in Motor-Controlling Systems, of which the following is a specification.

My invention relates to improvements in motor controlling systems and one of its objects is to improve upon the systems now in use and to provide simple and efficient means for accomplishing this end.

A further object is the provision of means for effecting a dynamic brake action of the motor upon slowing down or stopping, and of automatically varying the degree of said brake action.

Other objects will appear hereinafter, the novel combinations of elements being pointed out in the appended claims.

My invention is particularly adapted to the control of an electric motor used for elevator service, wherein the motor, in slowing down or stopping, generates a current which is used to effect a dynamic brake action of the motor, tending to reduce the speed of the same. This dynamic brake action is all that is necessary to effect the desired speed reduction, although when it is desired to bring the motor to a complete stop, the retarding effect due to the dynamic brake action is augmented by the use of the usual spring pressed friction brake. In elevator practice it is customary to arrange the motor controlling system in such manner that as the car approaches either limit of travel, the motor is automatically, gradually slowed down prior to stopping, by means of the dynamic brake action of the motor. In such cases the retarding force of the dynamic brake action is so adjusted or proportioned that the rate of speed reduction will be best suited to meet any particular condition met in practice. It is found, however, that where the arrangement is such as to produce a proper speed reduction at the limits of travel, the stop produced by the operator in the car, should he suddenly move the controlling switch to stop position with the motor running at substantially full speed, is much too quick. This quick stop causes sparking at the brushes of the motor and imposes a severe strain upon the hoisting mechanism, and, in the case of a direct drive or traction elevator system, causes the cables to slip about the driving sheath.

My invention is for the express purpose of so controlling or regulating the retarding effect of the dynamic brake action that an elevator car may be brought to rest automatically at any point in its travel, smoothly and quickly without producing any jar or undue strain upon the elevator mechanism.

Figure 1 of the drawing represents diagrammatically a controlling system for an electric elevator embodying my invention. Fig. 2 shows in sectional elevation, the detail construction of the electro-magnetic switch E of Fig. 1. Figs. 3, 4, 5, 6, 7, 8 and 9 illustrate diagrammatically the constructions of the main, auxiliary and by-pass resistances with respect to the motor armature for different positions of the operating or controlling switch S in the car.

Like characters of reference denote similar parts through all the figures.

Referring to the drawing, R and R' designate motor starting and reversing switches, while M is the armature of an electric motor. F designates the motor field, and in the present instance is shown as a simple shunt winding, although my invention is not limited to shunt wound motors or motors of any particular type or winding.

I designates an auxiliary resistance which is used in starting or stopping the motor, while H is the main starting resistance which is included in the armature circuit of the motor upon starting and is automatically removed from, or cut out of said circuit as the motor attains full speed. The automatic means for controlling the starting resistance H consists of an accelerating magnet A which effects the closure of a plurality of contacts, 34, 35, 36 and 37 in successive order or sequence, these contacts being connected to the resistance at suitable points thereon.

B designates the magnet winding of the usual spring pressed electrically released brake apparatus which operates to retard the rotation of a brake or friction pulley secured to the armature shaft. The brake mechanism is not illustrated herewith since it involves nothing new and is widely used, hence a detail description is not considered necessary.

C designates a suspended elevator car which may be operatively connected to the motor armature M after the usual manner.

S is a hand switch in the car, by means of which the motor may be started, stopped and reversed in a manner to be pointed out hereinafter.

J designates a by-pass resistance while D, E and G are electro-magnetic switches for controlling certain circuits used in connection with my invention.

Having given a brief description of the various parts used in carrying out my invention, I will now describe in detail certain of the more important parts, at the same time tracing the circuits associated therewith so that a clear understanding may be had of the operation of the system as a whole.

The reversing switches R and R' are similar in construction and each comprises a solenoid core 7 to which is connected a rod 6. Fastened to this rod 6 are two insulated pieces 4 and 5 to which are secured contacts 11, 11', 13 and 16, 14 respectively. Directly below the contacts 16 and 14 are stationary contacts 17 and 15 respectively which are normally in contact therewith. Other stationary contacts 10 and 12 are located directly above the contacts 11, 11' and 13 respectively and under certain conditions are placed in electrical engagement therewith, that is, when the core 7 and connected parts are in their raised position. Surrounding the core 7 are two magnet windings 8 and 9, the winding 8 being adapted to raise the core 7 and connected parts when energized, while the winding 9 under certain conditions tends to pull the core 7 downwardly.

In order to start the motor to raise or lower the elevator car C, the operator effects the energization of one or the other of the reversing switches R and R' by moving the lever 53 of the car switch S to the left or right. We will assume that this lever is moved to the left until it assumes the position indicated by the broken line 1. In this position the lever 53 is in electrical engagement with the stationary contact 54, thereby establishing a circuit to the magnet winding 8 of the reversing switch R. This circuit may be traced as follows: from the + main by wire 61, to and through the winding 8, wire 58, contact 54, switch lever 53, and by wire 57 to the — main. The winding 8 is thereby energized to raise the core 7 and connected parts, thus causing the contacts 11, 11' and 13 to engage the contacts 10 and 12 respectively and at substantially the same time, separating the contacts 16, 17 and 14, 15 respectively. This operation closes a circuit to the motor armature and brake magnet, and at the same time short circuits the resistance L which heretofore was in series with the motor field. The brake magnet circuit is closed at the contacts 12 and 13 and the friction brake is thus released, allowing the motor to rotate freely. The armature circuit may be traced as follows:—from the + main by way of the contacts 10 and 11, wire 18, contacts 19 and 20 of the reversing switch R', wire 30, magnet windings 9' and 9, wire 29 to the brush 28, through the motor armature M, brush 27, wire 26, contacts 24 and 23 of switch E, wire 22, portion $a$ of the auxiliary resistance I, wire 21, contacts 32 and 33, wire 31, and through the main resistance H to the — line. The motor now receives current and starts to rotate at slow speed with full field strength, the current passing through the motor armature being limited in amount by reason of the resistance in series therewith and also by reason of the by-pass connection around, or in shunt to, the motor armature. This by-pass circuit comprises the portion $c$ of the by-pass resistance J and may be traced from the armature brush 28, wire 29, magnet windings 9 and 9', wire 64, resistance $c$, contacts 41, wires 40 and 26 to the motor brush 27. It will be noticed that portion $d$ of the by-pass resistance J and the portion $b$ of the auxiliary resistance I are not in circuit at this time since they are short-circuited by the contacts 44, 42, 41 and 23, 24 respectively. The electromagnets A, G and D will not operate at this time since their circuits are open. The electromagnet E will also remain inoperative as it is connected directly across the armature brushes, and, as the potential across the brushes at this time is of low value, the magnet E will not receive sufficient current to raise its magnet core 50 and connected contact plate 25. The above condition of circuits is represented diagrammatically in Fig. 3, the lever of the car switch being in position designated by the broken line 1 in Fig. 1.

In order to increase the speed of the motor, the car switch lever 53 is advanced until it assumes the broken line position 2, in which it engages both of the stationary contacts 54 and 55. This movement closes a circuit to the electromagnet D, this circuit being traced from the + main by way of the contacts 10 and 11, wires 18 and 65, magnet winding 52, wire 59, contact 55, switch lever 53, and by wire 57 to the — line. The winding 52 of magnet D is thereby energized to raise its core 51 and connected parts, thus separating the contacts 41 and placing the contacts 39 in electrical engagement with each other. The separating of the contacts 41 effects the removal of the short-circuit around the portion $d$ of the by-pass resistance J, thereby placing the entire resistance J in shunt to, or across, the motor brushes. This by-pass circuit may now be traced from the brush 28, wire 29, magnet windings 9 and 9', wire 64, resistance J, contacts 42 and 44, and by the wires 45 and 26 to the brush 27. Since the contacts 39 are connected to opposite ends of the resistance I, the closing of these contacts by the energization of the winding 52 of switch D short circuits the entire resistance I. The motor now accelerates in speed for the reason that the portion $a$ of the auxiliary resistance which was formerly in series with the motor armature has been short-circuited and also because the by-pass resistance across the motor brushes has been increased by the addition of the portion $d$. It should be observed that any operation of the magnet switch E at this time will produce no effect whatsoever, since the entire resistance I is short-circuited by the contacts 39 of switch D, hence the opening of the contacts 24, 23 will not affect the resistance I in any way. The condition of the motor circuits as they now stand is shown in Fig. 4.

In order to bring the motor to full speed, the car switch lever 53 is further advanced into the position indicated by the broken line 3, wherein the lever 53 is in electrical engagement with the contacts 54, 55 and 56. This operation closes a circuit to the magnet switch G, this circuit being traced as follows:—from the + line by way of the contacts 10 and 11, wires 18 and 65, magnet winding 47 of switch G, wire 60, contact 56, switch lever 53, and by wire 57 to the — main. The energization of the winding 47 causes the core 46 to move upwardly, thereby open circuiting the contacts 42 and 44 by removing the bridging member 43 out of engagement therewith, and also effecting an electrical engagement of the contacts 48. Upon open-circuiting the contacts 42 and 44 the by-pass resistance J is open-circuited, while the closing of the contacts 48 establishes a circuit to the magnet-winding of the accelerating magnet A. By tracing the circuit of the accelerating magnet A, it will be seen that its terminals are connected across a circuit comprising the motor armature and a small portion of the main starting resistance H, thus the winding of this magnet will be subjected to the counter-electro-motive force of the rotating armature. As the motor accelerates in speed the magnet A will automatically operate successively to close the contacts 34, 35, 36 and 37 controlled thereby in successive order and in this manner the starting resistance H will be short-circuited step-by-step and the motor will gradually attain full running speed, its armature being connected directly across the mains. This condition of circuits is shown in Fig. 5. If the operator in the car had moved the switch lever 53 to the right, the operation would have been similar to that just pointed out excepting that the magnet 8' would have been energized instead of the magnet 8, and the reversing switch R' controlled thereby would close the circuits in such a way as to cause the motor armature to rotate in the opposite direction.

The operation of stopping may be effected by moving the lever of the car switch slowly back to its center or off position, or by placing the car switch lever in full speed position and allowing the automatic switches at the top and bottom limits, to operate, or the car switch may be suddenly moved to off position to effect a more rapid stop. In order to stop the motor slowly, the operator moves the lever of the car switch back until it reaches the position indicated by the broken line 2, or out of electrical engagement with the contact 56. The circuit to the winding of magnet switch G is now interrupted and the core 46 drops, thereby open-circuiting the contacts 48 and again placing the contacts 42 and 44 into electrical engagement. The separation of the contacts 48 open-circuits the winding of the accelerating magnet A, and the main starting resistance H is again placed in series with the motor armature across the line. The bridging of the contacts 42 and 44 re-inserts the by-pass resistance J across the motor brushes. It is seen that the re-insertion of the resistance H in the armature circuit will, under certain conditions, reduce the armature current and speed, while the placing of the resistance J in shunt to the armature will effect a reduction in speed due to the dynamic brake action produced by the $C^2R$ loss in the resistance J. This condition of motor circuits is shown in Fig. 6. The car switch lever is next placed in the broken line position designated by 1, thereby open-circuiting the winding 52 of switch D at the switch contact 55. The switch D immediately drops its contacts; the lower ones, 41, short-circuiting the portion $d$ of the by-pass resistance, thereby lowering the resistance across the motor brushes and increasing the dynamic brake effect, while the upper contacts 39 become separated and open the short circuit around the resistance I and placing the portion $a$ of the auxiliary resistance back in series with the motor armature and the main resistance H. The effect of this operation is to further reduce the speed of the motor and to reduce the amount of current flowing to the motor from the main line which effects a substantial economy in current consumption. The magnet E in the meanwhile will have become deënergized, an amount sufficient no longer to retain its core in raised position, owing to the reduced speed of the motor and subsequent low counter-electromotive-force of the armature, hence the same drops its core and electrically connects the contacts 23 and 24, thereby short-circuiting the portion *b* of the auxiliary resistance I. The motor circuits under the above conditions are shown in Fig. 3. If the load on the motor at this time is such as to exert a strong driving force, the electro-motive force will remain high enough to maintain the magnet of switch E energized so that the contacts controlled thereby are not in electrical engagement. In this case the portion *b* of the resistance I will not be short-circuited until the electro-motive-force and speed of the motor are reduced sufficiently to permit the magnet E to drop its contacts. This condition of motor circuits would be represented by Fig. 7. The car switch is next brought to center or off position, thereby open-circuiting the winding 8 of the reversing switch R and causing the contacts 14, 15 and 16, 17 respectively to come into electrical engagement, and at substantially the same time interrupting all current from the main line at the contacts 10 and 12. The dropping of the reversing switch R establishes a second dynamic brake circuit including the portion *a* of the auxiliary resistance I, this circuit being traced as follows:—from the brush 28, through the winding 9 and 9', wire 30, contacts 20 and 19 of reversing switch R', wire 18, contacts 14 and 15 of reversing switch R, wire 21, portion *a* of the resistance I, wire 22, contacts 23 and 24, and by wire 26 to the opposite brush 27. The dynamic brake effect is therefore greatly increased since the current generated by the motor running as a dynamo, is short-circuited through a comparatively low resistance. This powerful dynamic brake action is assisted by the friction brake which comes into action at this time since the circuit to its magnet winding B was open-circuited at the moment the reversing switch R dropped its contacts. In this manner the motor comes to rest, the condition of its circuits at this time being shown in Fig. 9.

Should the motor be running at substantially full speed and developing a correspondingly high counter-electro-motive-force, and the car switch lever be rapidly brought back to its center or stop position, it is readily seen that the dynamic brake action would be too powerful, owing to the high speed of the motor, hence it becomes necessary or desirable to reduce or render less powerful the dynamic brake action at this time, and this I most effectually accomplish by means of the switch E. As before pointed out, the magnet 49 of switch E is connected directly across the brushes of the motor, hence it will depend for its operation upon the electro-motive-force of the armature. When the operator moves his switch lever rapidly from full speed position to stop position, the magnet 49 is excited with maximum current, hence the core 50 will be in raised position, and the portion *b* of the auxiliary resistance I is not short-circuited by the contacts 23 and 24. Thus it is seen that the dynamic brake circuit established by the deënergization of the reversing switch magnet 8, now includes the whole of the auxiliary resistance I instead of only the portion *a*, and, since the resistance of this circuit is greater than the resistance of the circuit which includes only the portion *a*, it follows that the current flow, as well as the dynamic brake action, are substantially reduced. This condition of motor circuits is represented by Fig. 8. As the motor slows down, its electro-motive-force is reduced until finally the magnet 49 is no longer able to sustain its core in raised position, hence the latter will drop and place the contacts 24 and 23 into electrical engagement with each other. This operation increases the dynamic brake action by short-circuiting the portion *b* of the resistance I and allowing more current to flow. In this manner the magnetic switch E automatically controls the dynamic brake action by the varying electro-motive-force of the armature. If so desired, the magnet E may be a multiple magnet, or a series of magnets whose contacts may be connected to intermediate points along the resistance I so as to insert or cut out of circuit portions of this resistance, and in this manner graduate the steps of resistance, thus tending to produce a smoother stopping effect and greater refinement in operation. When it is desired to employ more than a single magnet switch E to insert or cut out of circuit the resistance I in steps, I prefer to arrange a series of magnets so that they will operate in a certain definite order or sequence, not only when these magnets respond to an increase in potential of the motor armature, but also when they respond to a drop in potential. This feature may be attained by means of the construction shown in Fig. 2 or in other ways well known in the art.

Referring to Fig. 2, it is seen that the magnetic switch E comprises an iron-clad magnet having a frame 68 which incloses the winding 49 and protects it against mechanical injury. The winding 49 is wound upon an insulated spool 72 through the center of which passes a brass tube 73. The magnet core 50 is arranged to slide freely in said tube, at the upper end of which is arranged an adjustable plug 69 of iron or other magnetic material. This plug may be raised or lowered in the tube 73 so as to vary the air gap between the core 50 and the plug 69. A set screw 71 is for the purpose of securing the plug 69 in any desired position, while the shoulder 70 on the core 50 limits the movement of the latter in an upward direction. The shoulder 70 is threaded upon the magnet stem 76 and may be secured in any desired position thereon by means of the lock nut 75. 74 is a washer of leather or other resilient material which engages the lower face of the magnet frame 68 when the core 50 is in its raised position and thus eliminates all slamming and noise which would be occasioned were not some such means provided.

A switch constructed in the above manner may be arranged to both raise and drop its core at any desired time by varying the position of the plug 69 and shoulder 70.

I am aware that it is not broadly new to place a resistance across the motor brushes in stopping in order that the current generated by the motor running as a dynamo may be absorbed and so effect a retardation of the motor armature, but I believe it to be new in the art to control the amount of this resistance according to the varying potential of the armature. It is evident that the amount of resistance which is placed in shunt to the armature at the moment of stopping when the armature is rotating at high speed, should be at a maximum because at such time the electro-motive-force is at its highest point. Furthermore it is desirable to reduce the amount of this resistance as the motor slows down and its electro-motive-force decreases so that the dynamic brake action may be maintained sufficiently powerful to act effectively as long as the motor armature continues to rotate. By means of my invention the dynamic brake action applied to stop the motor when the same is running at substantially full speed, is of a predetermined value, and as the motor slows down the automatic operation of the magnet switch E may increase the dynamic brake action to any desired amount, so that the braking effect tending to retard the motor armature increases as the same undergoes a reduction in speed. This feature is of great practical value, as I have found by actual experience that the motor, even under heavy loads and traveling at high rates of speed and used with such connections, as with elevators, can be quickly and easily stopped without producing jars or jolts, and the most exacting requirements in connection with this class of work can be readily fulfilled.

It will be seen that the deënergization of the reversing switch magnet 8 does not open-circuit the shunt field winding F but merely introduces a resistance L in series therewith. In this manner the field is kept alive so as to be sure that the rotating armature will generate a current when the reversing switches are in open position, and not relying upon the small residual field left in the motor after opening the shunt field circuit.

While this arrangement is desirable, it is not essential.

Referring again to Fig. 1, it will be seen that all current passing through or generated by the motor armature also passes through both windings 9 and 9'. These windings are arranged to produce a downward pull upon their respective cores 7 and 7' when the latter are in their lowermost positions. The function of these magnets is of considerable importance since it prevents the operator in the car from suddenly reversing the motor. The reason for this is due to the fact that as soon as the operator attempts to suddenly reverse, a dynamic brake circuit is established through the windings 9 and 9' and the downward pull thus holds both reversing switches in their lowermost position against any tendency of the magnets 8 or 8' to raise or close these switches until the dynamic brake current generated by the motor in the windings 9 and 9' has been greatly reduced, which current reduction is proportional to the reduction in speed of the rotating armature. This feature for preventing a too sudden reversal of an electric motor is described at length and the novel features thereof claimed in my co-pending application filed November 22nd, 1909 Serial No. 529,221.

I desire not to be limited to the precise construction and arrangement of parts herein disclosed, since it is obvious that those skilled in the art could readily make various changes in the details thereof without departing from the spirit and scope of my invention.

What I claim as new and desire to have protected by Letters Patent of the United States, is:—

1. In a system of motor control, the combination with a motor, of circuits therefor including parallel circuits to the armature, a resistance in one of said parallel circuits, and automatically operated means dependent on the speed of the motor for varying said resistance in response to reduction in the motor speed while the other circuit is closed.

2. In a system of motor control, the combination with a motor, of means for connecting the motor to a source of current supply, circuits for the motor including a parallel circuit to the armature, a resistance in said parallel circuit, and means for varying said resistance according to the speed of the motor while the motor is disconnected from said source of current supply.

3. In a system of motor control, the combination with a motor, of means for connecting and disconnecting the motor to and from a source of current supply, circuits for the motor including a parallel circuit to the armature, a resistance in said parallel circuit, and electromagnetic means for varying said resistance according to the varying potential of the motor armature while the motor is disconnected from said source of supply.

4. In a system of motor control, the combination with a motor, of means to connect the motor to current supply means, circuits for the motor including a parallel circuit to the armature, resistance in said parallel circuit, electromagnetic means for varying said resistance according to the varying potential of the motor armature while the motor is disconnected from the supply mains, and means for controlling the operation of said electromagnetic means.

5. In a system of motor control, the combination with a motor, of circuits therefor including a resistance, means for connecting said resistance in series with the motor armature upon starting, and for connecting said resistance in parallel to the motor armature upon stopping, and means operated by the motor for varying said resistance in response to variations in the speed of the motor armature.

6. In a system of motor control, the combination with a motor, of circuits therefor including a resistance, an electro-responsive device for connecting said resistance in series and parallel relation to the motor armature, and means operated by the motor for varying said resistance when in parallel relation in response to the varying potential of the motor armature.

7. In a system of motor control, the combination with a motor, of circuits therefor including a resistance, an electro-responsive device arranged to connect said resistance in series or parallel relation to the motor armature, and means operated by the motor for varying said resistance when the latter is in parallel relation.

8. In a system of motor control, the combination of a motor, a source of electrical supply, a resistance, an electro-responsive device adapted when in one position to connect the motor and resistance to the source of electrical supply, and when in another position to disconnect said source of electrical supply, and connect the motor and resistance in parallel to each other, and means effected by the varying potential of the motor armature for controlling said resistance.

9. In a system of motor control, the combination with a motor, of means for closing a parallel circuit to the motor, additional means for closing a second parallel circuit to the motor and maintaining both of said circuits closed at the same time, resistance in both of said parallel circuits, and means dependent upon the motor for varying the resistance in one of said parallel circuits.

10. In a system of motor control, the combination with a motor, of means for effecting a decrease in speed of the same, said means comprising a resistance connected in parallel to the motor armature, an additional parallel circuit to the motor armature containing resistance for effecting a further speed reduction, and means for varying said last named resistance.

11. In a system of motor control, the combination with a motor, of a circuit containing resistance in parallel relation to the armature of said motor, an additional circuit containing resistance in parallel to the motor armature, and means operated by the varying potential of the motor armature for varying the resistance in one of said parallel circuits while the other circuit is established.

12. In a motor control system, the combination with a motor, of a plurality of parallel circuits to the armature of said motor, resistance in each of said circuits, means for closing said circuits, and means dependent upon the speed of the motor for effecting a variation of the resistance in one of said parallel circuits while both of said circuits are closed.

13. In a motor control system, the combination with a motor, of two independent circuits containing resistance arranged to be connected in parallel to the motor armature, electromagnetic means for closing said parallel circuits, and means automatically operated according to the varying potential of the motor armature for controlling the resistance of one of said independent circuits while the other circuit is closed.

14. In a motor control system, the combination with a motor, of a plurality of circuits containing resistance arranged in parallel to the motor armature and to each other, means for controlling said circuits, electromagnetic means controlled by the motor for varying the resistance of one of said circuits, and means for regulating the operation of said electromagnetic means.

15. In a system of motor control, the combination with an electric motor, of a plurality of circuits each containing resistance, means for connecting one or more of said circuits in parallel to the motor armature, and an electromagnet automatically operated according to the varying potential of the motor armature for controlling the resistance in one of said circuits while the other of said circuits is established.

16. In a system of motor control, the combination with an electric motor, of a plurality of circuits each containing resistance, means for connecting said circuits in parallel to the motor armature, an electromagnet controlled by the speed of the motor and arranged to control the resistance in one of said parallel circuits while the resistance of the other circuit is in parallel with the motor, and means for controlling the operation of said electromagnet.

17. The combination with a motor, of a resistance, means for connecting said resistance in series and in parallel to the motor armature, and means operated by current from the motor for varying said resistance in response to variations in the motor speed when the resistance is in parallel relation with respect to the motor armature.

18. The combination with an electric motor, of a resistance connected in series therewith, an additional resistance connected in parallel to the motor armature, electro-magnetic means arranged to connect said first named resistance in parallel to the motor armature to reduce the speed of the same, and means controlled by the motor for varying the resistance in one of said parallel circuits.

19. The combination with an electric motor, of a resistance connected in series therewith, an additional resistance connected in parallel to the motor armature, electromagnetic means for simultaneously varying both of said resistances to increase the speed of the motor, means for connecting said first named resistance in parallel to the motor armature to reduce the speed of the latter, and means controlled by the varying potential of the motor armature for varying the resistance in one of the parallel circuits to the motor armature.

In testimony whereof, I have signed my name to this specification in the presence of two subscribing witnesses.

WILLIAM D. LUTZ.

Witnesses:
 JOHN F. RULE,
 AUGUST SUNDH.